United States Patent [19]

Vassiliou

[11] 4,180,609
[45] Dec. 25, 1979

[54] ARTICLE COATED WITH FLUOROPOLYMER FINISH WITH IMPROVED SCRATCH RESISTANCE

[75] Inventor: Eustathios Vassiliou, Newark, Del.

[73] Assignee: E. I. Du Pont de Nemours and Company, Wilmington, Del.

[21] Appl. No.: 881,668

[22] Filed: Feb. 27, 1978

Related U.S. Application Data

[63] Continuation-in-part of Ser. No. 701,746, Jun. 30, 1976, abandoned, which is a continuation-in-part of Ser. No. 595,175, Jul. 11, 1975, abandoned.

[51] Int. Cl.² .................. B32B 7/00; C08L 27/18; B32B 27/00
[52] U.S. Cl. .................. 428/212; 260/29.6 F; 427/409; 427/419 R; 427/388 C; 427/419 A; 427/388 R; 427/372 A; 428/216; 428/324; 428/328; 428/329; 428/334; 428/335; 428/336; 428/363; 428/422; 428/461; 428/463; 428/522; 428/523; 428/404
[58] Field of Search .................. 260/29.6 F, 29.6 RB, 260/29.6 RW, 29.6 MM, 900; 428/461, 212, 216, 324, 363, 404, 522, 523, 328, 329, 334–336, 422, 463; 427/409, 419 R, 388 C, 419 A, 385 R, 372 A

[56] References Cited

U.S. PATENT DOCUMENTS

| | | | |
|---|---|---|---|
| 2,681,324 | 6/1954 | Hoehberg | 428/422 |
| 2,777,783 | 1/1957 | Welch | 428/422 |
| 2,961,341 | 11/1960 | Long | 428/422 |
| 2,979,418 | 4/1961 | Dipner | 428/422 |
| 3,054,761 | 9/1962 | Moore | 260/2.5 |
| 3,062,764 | 11/1962 | Osdal | 260/29.3 |
| 3,087,827 | 4/1963 | Klenke | 106/291 |
| 3,087,828 | 4/1963 | Linton | 106/291 |
| 3,087,829 | 4/1963 | Linton | 106/291 |
| 3,293,203 | 12/1966 | Paulus | 428/422 |
| 3,340,216 | 9/1967 | Mack | 428/422 |
| 3,840,512 | 10/1974 | Brackman | 260/23 H |
| 3,970,627 | 7/1976 | Seymus | 428/422 |
| 4,039,713 | 8/1977 | Vassiliou | 428/422 |
| 4,049,863 | 9/1977 | Vassiliou | 428/422 |
| 4,054,704 | 10/1977 | Vassiliou | 428/422 |
| 4,064,303 | 12/1977 | Vassiliou | 428/422 |

Primary Examiner—Ellis P. Robinson

[57] ABSTRACT

The apparent scratch resistance of articles coated with a fluoropolymer finish is improved if the article is coated with at least two coats with the topcoat containing mica particles, mica particles coated with a pigment, or metal flake in a smaller amount than is contained in the coat under the topcoat.

17 Claims, No Drawings

ARTICLE COATED WITH FLUOROPOLYMER FINISH WITH IMPROVED SCRATCH RESISTANCE

CROSS-REFERENCE TO RELATED APPLICATIONS

This application is a continuation-in-part of application Ser. No. 701,746, filed June 30, 1976 abandoned which in turn is a continuation-in-part of application Ser. No. 595,175, filed July 11, 1975 abandoned.

BACKGROUND OF THE INVENTION

Cookware coated with fluoropolymers, especially polytetrafluoroethylene (PTFE), has come into widespread use in recent years. Many cooks prefer to use such cookware because of its non-stick properties and because it is so easy to clean.

While cookware of this type is quite durable, the fluoropolymer coating tends to become scratched after extended use because it is somewhat softer than the utensils used to stir and turn the food in the ware.

Fluoropolymer compositions which contain mica particles, mica particles coated with pigment, or metal flake, give fluoropolymer finishes of this general type having improved scratch resistance. This improved scratch resistance is actual and can be measured physically with instruments. However, the apparent scratch resistance, that which is perceived by the user of the cookware, may not be as high as the actual scratch resistance because food lodges in the slight scratches which may be present and becomes oxidized. These scratches become highlighted because of the high optical contrast between the finish and the oxidized food, and are therefore much more noticeable than they would ordinarily be.

SUMMARY OF THE INVENTION

The present invention provides an article bearing a basecoat derived from a composition comprising
(a) a particulate polymer of monoethylenically unsaturated hydrocarbon monomers completely substituted with fluorine atoms or a combination of fluorine atoms and chlorine atoms;
(b) mica particles, mica particles coated with pigment, or metal flake; and
(c) a liquid carrier;
overlaid with a topcoat finish derived from a composition comprising (a), (b), and (c), wherein the concentration of (b) is less in the topcoat than in the basecoat.

DETAILED DESCRIPTION OF THE INVENTION

Representative base coats of articles coated according to this invention are described in U.S. application Ser. No. 710,618, filed Aug. 2, 1976 and now abandoned; Ser. No. 606,298, filed Aug. 22, 1975 and now abandoned; Ser. No. 606,297, filed Aug. 22, 1975 and now abandoned; Ser. No. 606,299, filed Aug. 22, 1975 now U.S. Pat. No. 4,064,303, granted Dec. 20, 1977; Ser. No. 606,296, filed Aug. 22, 1975 now U.S. Pat. No. 4,054,704, granted Oct. 18, 1977 and Ser. No. 400,040, filed Sept. 24, 1973, now U.S. Pat. No. 3,970,627, granted July 20, 1976. The disclosures of these applications are incorporated into this specification to describe the base coats and how they are obtained.

Coating compositions used in the invention include dispersions of a fluoropolymer in a carrier. The fluoropolymers, carriers and concentrations which can be used are the same as those described in the applications incorporated by reference. The same fluoropolymer is preferably the same one used in each coat, and in the most preferred case is PTFE. The fluorocarbon polymers used are those of monomers of hydrocarbons or hydrocarbon ethers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and per fluoroalkyl vinyl ethers. Mixtures of these can also be used.

The amount of total solids in the coating compositions will be governed by the method of application, the curing procedures and like factors. Ordinarily, the composition will contain about 10–80% of total solids.

The topcoat composition will show improved coalescence on curing if it also contains a polymer additive, which is a polymer of ethylenically unsaturated monomers which depolymerizes at the curing temperature of the film, as more particularly described in the aforementioned application Ser. No. 710,618.

This polymer additive is ordinarily present in the topcoat composition at a concentration of about 5–75%, by weight of the total of fluoropolymer and polymer additive, preferably about 5–15%, the fluoropolymer being present in a complementary amount to make the total fluoropolymer and polymer additive present equal to 100%.

The preferred polymer additive is an acrylic latex such as of a methyl methacrylate/ethylacrylate/methacrylic acid 39/57/4 terpolymer. The acrylic particles in the latex preferably have a particle size under 1 micron ($\mu$m), more preferably under 0.5 $\mu$m, most preferably under 0.3 $\mu$m, and they are present in the latex as a stable aqueous dispersion. Alternatively, the acrylic could be provided as a solution in suitable solvents.

Preferably, the polymer additive is a polymer of monoethylenically unsaturated monomers containing one or more of an alkyl acrylate or methacrylate having 1–8 carbon atoms in the alkyl group, styrene, alpha methyl styrene or vinyl toluene, and the acid unit is of acrylic acid, methacrylic acid, fumaric acid, itaconic acid, maleic acid or maleic anhydride optionally esterified with a glycidyl ester of 4–14 carbon atoms (total).

If the polymer additive is used, it may also be desirable for the topcoat composition to contain a metal compound which will catalyze the depolymerization of any residue of polymer additive, whose presence might discolor the final finish.

This metal compound can be an oxide or hydroxide of

| (1) | |
|---|---|
| copper | gallium |
| cobalt | iridium |
| iron | rhodium |
| nickel | platinum |
| chromium | palladium |
| vanadium | tin |
| tantalum | tungsten |
| cerium | lithium |
| thorium | sodium |
| manganese | potassium |
| bismuth | lead |
| cadmium | ytterbium |

-continued

| | |
|---|---|
| molybdenum | or silver | or (2) a compound of any of the metals listed in (1) which decomposes in the temperature range of about 100° C.-500° C. to give at least 0.2%, by weight of the metal in the compound, of an oxide or hydroxide.

The metal compound, when it is used, will ordinarily be present in the topcoat composition at a concentration which will provide about 0.005-5 parts of metal per hundred parts of fluoropolymer used.

Preferred metals selected from the list above are:

| | | |
|---|---|---|
| Chromium | Cerium | Lithium = |
| Cobalt | Thorium | Sodium |
| Iron | Manganese | Potassium |
| Nickel | Bismuth | Lead |
| | Cadmium | or |
| | | Molybdenum |

Further preferred, especially for use in food-contact applications, are oxides or hydroxides of lithium, sodium or potassium, and those compounds produced by reaction of a metal from the following list (1) with an acid to form a salt compound of list (2).

| | |
|---|---|
| (1) Metals: | |
| Bismuth | Manganese |
| Cerium | Lithium |
| Cobalt | Potassium |
| Iron | Sodium |
| (2) Salts: | |
| Acetate | Octoate |
| Caprate | Oleate |
| Caprylate | Palmitate |
| Isodeconoate | Ricinoleate |
| Linoleate | Soyate |
| Naphthenate | Stearate |
| Nitrate | Tallate |

Especially preferred oxidation catalyst compounds are:

| | |
|---|---|
| Cobalt octoate | Bismuth octoate |
| Cerium octoate | |
| Manganese octoate | |
| Iron octoate | |

Most preferred as an oxidation catalyst for general purposes of the invention is a combination of cobalt and cerium octoates.

In some cases, it may also be desirable for the topcoat composition to contain an antioxidant to prevent discoloration of the final finish when cookware bearing the finish is subjected to excessive heat over a prolonged period. These antioxidants are, generally speaking, compounds containing phosphorus, sulfur, boron, or combinations of these. Illustrative of such compounds are the ortho-, meta- and pyro acids of these element; their neutral and basic salts; their esters; and their organic- and organo-metallic derivatives.

The preferred antioxidants are phosphoric acid, at least completely neutralized with organic base such as triethanolamine or with ammonia, particulately decomposable phosphate salts containing ammonia or amines, 2-ethylhexyldiphenyl phosphate, magnesium glycerophosphate, calcium glycerophosphate, and iron glycerophosphate. Preferably the acid is sufficiently neutralized so that the coating composition has a pH of at least 8 to prevent coagulation of PTFE suspended in the composition.

The antioxidants are ordinarily present in the compositions at a concentration of about 0.1–10%, by weight of the total solids in the composition.

The topcoat composition can also contain such conventional additives as flow control agents, surfactants, plasticizers, etc., as are necessary or seem desirable. These additives are added for the usual reasons, in the usual ways and in the usual amounts.

Pigments that can be used in coating compositions of the invention include pigments ordinarily used in fluorocarbon coatings to develop the desired colors and pigments having refractive indices substantially the same as that of the fluoropolymer used. Representative of the latter type of pigments are alumina, silica, clays and glass spheres. These pigments are advantageously present in the topcoat composition at a concentration of about 3–30%, by weight of the fluoropolymer to enhance apparent scratch resistance of the topcoat. Colors and opacity can be obtained with such pigments as $TiO_2$ and iron oxide.

The invention involves the use of flake-type pigments of mica particles, mica particles coated with pigment, and metal flake. Mica particles coated with pigment are preferred, especially those described in U.S. Pat. Nos. 3,087,828 and 3,087,829 to Linton and 3,087,827 to Klenke and Straton. Such flake type pigments are used at least in the topcoat and the coat directly under the topcoat, with the concentration in the topcoat being less that that in the lower coat. When the coated article has 2 coats on it, the lower cost is the primer. When the coating has 3 or more coats, the lower cost is an intermediate coat adjacent to the topcoat. The terms "lower coat" and "basecoat" are used herein to mean the coat beneath the topcoat, whether it is a primer or an intermediate coat.

The ratio by weight of the flake pigment to the solids content of each coat is such that the topcoat has 10 to 90% as high a concentration of flake pigment as does the lower coat. Preferably, the range is from 30 to 70%. The most preferred proportion is 50%.

As a percentage of solids in each of the coats of a 3-layer coating the preferred and most preferred amounts of flake pigment are as follows:

| | Preferred | Most Preferred |
|---|---|---|
| Topcoat | 0.5°-2.0% | 1% |
| Intermediate | 1.0°-4.0% | 2% |
| Primer | 0°-1.0% | 0.2% |

The thickness of the three coating layers expressed in $\mu m$ are as follows:

| | Preferred | Most Preferred |
|---|---|---|
| Topcoat & Intermediate | 12.5-125 | 25-50 |
| Primer | 2.5-4.0 | 7.5-12.5 |

The relative thickness of the intermediate and topcoat can vary from 10-90% intermediate and from 90-10% topcoat. More preferably, the intermediate and topcoat will have about the same thickness.

In the development of the present invention it was found that multi-layer coats with as much or more flake pigment in the topcoat as in the lower coat suffer from an increase in apparent scratching in use tests. When a fork was used to scratch the surface during cooking tests over an extended period of time, it was found that the larger amount of flake pigment in the topcoat led to more superficial scratches, perhaps caused by disturbing the orientation of the flake pigment.

The next attempt to obtain improved scratch resistance utilized a 3-layer coating with equal proportions of flake pigment in the primer and intermediate coat but no flake pigment in the topcoat. This combination requires close control of the thickness of the topcoat to avoid discoloration upon curing too thick a topcoat and increased apparent scratching with too thin a top coat. The solution to these problems was found by using a 2 or 3 layer coat with flake pigment in both the topcoat and the coat beneath it, with less flake pigment in the topcoat that in the lower coat.

The multilayer coatings of the invention are most useful for coating metal cookware, especially frypans, but the compositions can also be used to coat other articles requiring scratch resistant fluoropolymer coatings. These other articles can be made of glass ceramic, plastic or any other material capable of withstanding the baking temperatures used. For example, the compositions can be used to coat bearings, valves, wire, metal foil, boilers, pipes, ship bottoms, oven liners, iron soleplates, waffle iron, ice cube trays, snow shovels and plows, chutes, conveyors, dies, tools such as saws, files and drills, hoppers and other industrial containers and molds.

The following examples illustrate the invention. In these examples all parts and percentages are by weight unless indicated otherwise.

EXAMPLE 1

A topcoat composition was prepared by mixing the following in the order listed:

| | | | |
|---|---|---|---|
| (1) Aqueous PTFE dispersion, 60% solids, (Teflon ® TFE Fluorocarbon Resin Aqueous Dispersion T-30 sold by E. I. du Pont de Nemours and Company) | | 772.33 | parts |
| (2) Deionized water | | 43.9 | parts |
| (3) TiO$_2$ coated mica ("Afflair" NF-152-D sold by E. I. du Pont de Nemours and Company) | | 4.72 | parts |
| (4) A mixture of | | 137.62 | parts |
| Butyl carbitol | 12.51% | | |
| Tolune | 30.72% | | |
| Cerous octate | 4.94% | | |
| Triethanolamine | 37.11% | | |
| Oleic acid | 9.67% | | |
| Triton X-100 (a non-ionic surfactant sold by Rohm & Haas Co.) | 5.05% | | |
| (5) Aqueous 40% solids, of a dispersion of methyl methacrylate/ethylacrylate methacrylic acid 39/57/4 terpolymer | | 143.43 | parts |

This composition was applied to a gritblasted aluminum frypan, basecoated as described in Example 4 of U.S. application Ser. No. 710,618, now abandoned, except that the final baking was omitted. The wet thickness of the film was 15 microns.

Both films were then air-dried and the pan baked at 425° C. for 5 minutes.

The resulting finish remained substantially free of apparent scratches after extended use.

EXAMPLE 2

A topcoat composition was prepared by mixing the following in the order listed:

| | | | |
|---|---|---|---|
| (1) The PTFE dispersion of Example 1 (1) | | 70.95 | parts |
| (2) Deionized water | | 3.87 | parts |
| (3) A mixture of | | 6.19 | |
| Triethanolamine | 25.86% | | |
| Butyl carbitol | 15.76% | | |
| Tolune | 46.26% | | |
| Oleic acid | 12.12% | | |
| (4) The dispersion of Example 1 (5) | | 11.90 | parts |
| (5) A mixture of | | 5.66 | parts |
| Deionized water | 60.97% | | |
| Phosphoric acid 85% | 6.47% | | |
| Triethanolamine | 32.56% | | |
| (6) TiO$_2$ coated mica ("Afflair" NF-152-D sold by E. I. du Pont de Nemours and Company) | | 00.43 | part |

This composition was applied, to a thickness of 15 microns, to a grit-blasted aluminum electric frypan basecoated as described in Example 5 of U.S. application Ser. No. 710,618, now abandoned, except that the final baking was omitted.

The 2-layer coating was then air-dried and the pan baked at 425° for 5 minutes.

The resulting finish remained substantially free of apparent scratches and discoloration after extended use.

EXAMPLE 3

To make an article of the invention with a 3-layer coating, a grit-blasted aluminum substrate was first coated with a primer in accordance with Example 2 of U.S. application Ser. No. 737,617, filed Nov. 1, 1976, now U.S. Pat. No. 4,070,525, granted Jan. 24, 1978. Then an intermediate coat was applied and a topcoat was applied on top of it while the intermediate coat was still wet, using the following compositions:

| Intermediate Coat | | |
|---|---|---|
| (1) PTFE Dispersion of Ex. 1 (1) | | 737.19 |
| (2) Deionized water | 66.40 | |
| (3) Yellow Pigment Dispersion | | 2.81 |
| Yellow iron oxide | 45% | |
| Deionized water | 54.5% | |
| Sodium Polynaphthalene Sulfonate | 0.5% | |
| (4) Blue Pigment Dispersion | | 2.81 |
| Cobaltoxide-Aluminum Oxide Pigment | 45% | |
| Deionized water | 54.5% | |
| Sodium Polynaphthalene Sulfonate | 0.5% | |
| (5) Afflair ® TiO$_2$ coated mica of ex. 1(3) | | 9.78 |
| (6) Solvent-Catalyst | | 138.79 |
| Buty Carbitol | 12.42% | |
| Toluene | 30.99% | mix until dissolved |
| Cerous Octoate (23% metal) | 4.83% | |
| Triethanolamine | 36.96% | |

-continued

| | | |
|---|---|---|
| Oleic acid | 9.84% | |
| Triton X-100 surfactant | 4.96% | |
| (7) Dispersion of Ex. 1 (9) | | 137.22 |
| Clear Topcoat | | |
| (1) PTFE Dispersion of Ex. 1 (1) | | 772.33 |
| (2) Deionized water | | 43.90 |
| (3) Afflair® TiO₂ coated mica of Ex. 1 (3) | | 4.72 |
| Solvent-Catalyst | | 137.62 |
| Butyl Carbitol | 12.51% ⎫ | |
| Toluene | 30.72% ⎬ mix until dissolved | |
| Cerous Octoate (23% metal) | 4.94% ⎭ | |
| Triethanolamine | 37.11% | |
| Oleic acid | 9.67% | |
| Triton X-100 surfactant | 5.05% | |
| (4) Dispersion of Ex. 1 (5) | | 143.43 |

I claim:

1. An article bearing a basecoat derived from a composition comprising:
   (a) a particulate polymer polymerized or copolymerized from monomers selected from one or more monoethylenically unsaturated hydrocarbon monomers and hydrocarbon ether monomers, said monomers being completely substituted with fluorine atoms or a combination of fluorine atoms and chlorine atoms;
   (b) mica particles, mica particles coated with pigment, or metal flake; and
   (c) a liquid carrier;
overlaid with a topcoat finish derived from a composition comprising (a), (b) and (c), with the concentration of (b) in the topcoat being from 10% to 90% of the concentration of (b) in the basecoat.

2. The article of claim 1 wherein the topcoat finish is derived from a composition comprising:
   (a) a polymer of monoethylenically unsaturated monomers completely substituted with fluorine atoms or a combination of fluorine atoms and chlorine atoms;
   (b) a polymer of ethylinically unsaturated monomers which depolymerizes and whose depolymerization products vaporize in the temperature range of about 150° C. below the fusion temperature of (a) to about the decomposition temperature of (a); and
   (c) a liquid carrier.

3. The article of claim 2 whose topcoat finish is derived from a composition which additionally contains a catalyst for the depolymerization of the (b) polymer.

4. The article of claim 2, wherein the polymer of monoethylenically unsaturated monomers contains one or more ethylenically unsaturated acid units.

5. The article of claim 4 wherein the polymer of monoethylenically unsaturated monomers is of one or more of an alkyl acrylate or methacrylate having 1–8 carbon atoms in the alkyl group, styrene, alpha methyl styrene or vinyl toluene, and the acid unit is of acrylic acid, methacrylic acid, fumaric acid, itaconic acid, maleic acid or maleic anhydride optionally esterified with a glycidyl ester of 4–14 carbon atoms (total).

6. The article of claim 2 whose topcoat finish is derived from a composition which additionally contains an antioxidant.

7. The article of claim 6 whose topcoat finish is derived from a composition in which the antioxidant is phosphoric acid.

8. The article of claim 1 wherein the basecoat is an intermediate coat and there is a primer coat beneath the intermediate coat.

9. The article of either claim 1 or claim 8 wherein the concentration of (b) in the topcoat is from 30 to 70% of the concentration of (b) in the basecoat.

10. The article of either claim 1 or claim 8 wherein the concentration of (b) in the topcoat is about 50% of the concentration of (b) in the basecost.

11. The article of claim 8 wherein the thickness of the primer coat is 2.5 to 4.0 μm and the combined thickness of the intermediate and topcoats is 12.5 to 125 μm.

12. The article of claim 8 wherein the thickness of the primer coat is 7.5 to 12.5 μm and the combined thickness of the intermediate and topcoats is 25 to 50 μm.

13. The article of either claim 11 or claim 12 wherein the thickness of the topcoat is from 10 to 90% of the combined thickness of the intermediate and topcoats.

14. The article of claim 8 wherein the polymer in (a) is polytetrafluoroethylene.

15. The article of claim 14 wherein the carrier in (d) is water.

16. The article of claim 15 wherein the coated mica particles in the basecoat composition are coated with an oxide of titanium, zirconium, aluminum, zinc, antimony, tin, iron, copper, nickel, cobalt, chromium, or vanadium.

17. A method for improving the apparent scratch resistance of an article bearing a basecoat derived from a composition comprising:
   (a) a particulate polymer polymerized or copolymerized from monomers selected from one or more monoethylenically unsaturated hydrocarbon monomers and hydrocarbon ether monomers, said monomers being completely substituted with fluorine atoms or a combination of fluorine atoms or chlorine atoms;
   (b) mica particles, mica particles coated with pigment, or metal flake;
   (c) a polymer of monoethylenically unsaturated monomers which depolymerizes and whose depolymerization products vaporize in the temperature range of about 150° C. below the fusion temperature of-(a) to about the decomposition temperature of (a); and
   (d) a liquid carrier;
the method comprising topcoating the basecoat with a composition comprising (a), (b), (c) and (d), wherein the concentration of (b) in the topcoat is from 10% to 90% of the concentration of (b) in the basecoat, and then fusing the coatings.

* * * * *